United States Patent
Fujita et al.

(10) Patent No.: US 8,259,573 B2
(45) Date of Patent: Sep. 4, 2012

(54) CONTENTS PROVIDING SYSTEM, SERVER DEVICE AND CONTENTS TRANSMISSION DEVICE

(75) Inventors: Takeshi Fujita, Tokyo (JP); Tsutomu Kawachi, Tokyo (JP); Keiichi Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 12/685,959

(22) Filed: Jan. 12, 2010

(65) Prior Publication Data

US 2010/0177781 A1 Jul. 15, 2010

(30) Foreign Application Priority Data

Jan. 15, 2009 (JP) ................. 2009-007058

(51) Int. Cl.
*G01R 31/08* (2006.01)
(52) U.S. Cl. ........................ 370/231; 370/401
(58) Field of Classification Search .......... None
See application file for complete search history.

(56) References Cited

U.S. PATENT DOCUMENTS
2010/0177781 A1* 7/2010 Fujita et al. .............. 370/401

FOREIGN PATENT DOCUMENTS
JP          2003-37802          2/2003
* cited by examiner

*Primary Examiner* — Robert Wilson
(74) *Attorney, Agent, or Firm* — Oblon, Spivak, McClelland, Maier & Neustadt, L.L.P.

(57) ABSTRACT

A user management server device (a) registers a contents transmission request when receiving the contents transmission request to an electronic device from a terminal device, (b) determines whether the contents transmission request to the electronic device is registered when there is an inquiry from the electronic device, and (c) transmits the contents transmission request to the electronic device as a response to the inquiry when the contents transmission request to the electronic device is registered. The electronic device makes an inquiry to the user management server device of whether the contents transmission request to the device itself is registered, and when receiving the contents transmission request as the response to the inquiry, transmits the contents specified by the contents transmission request.

8 Claims, 7 Drawing Sheets

FIG. 3

| USER ID | DEVICE ID |
|---|---|
| ax8291 | dev2372 |
| bx0618 | dev0091 |
| ⋮ | |
| cx5578 | dev1802 |

22

| DEVICE ID | USER ID |
|---|---|
| dev2372 | ax8291 |
|  | bx0618 |
| dev0091 | bx0618 |
| ⋮ | |
| dev1802 | cx5578 |

| DEVICE ID | CONTENTS ID | USER ID |
|---|---|---|
| dev2372 | * | ax8291 |
| | con28190 | bx0618 |
| | con28191 | * |
| dev0091 | * | bx0618 |
| ⋮ | | |
| dev1802 | * | * |

23

CONTENTS PROVIDING SYSTEM, SERVER DEVICE AND CONTENTS TRANSMISSION DEVICE

BACKGROUND OF THE INVENTION

1. Field of the Invention

The present invention relates to a contents providing system, a server device and a contents transmission device.

2. Description of the Related Art

A system in which contents stored in an electronic device connected to a local area network (hereinafter, referred to as a LAN) may be acquired by an external terminal through a wide area network (hereinafter, referred to as a WAN) such as the Internet is proposed (refer to, for example, Japanese Patent Application Laid-Open No. 2003-37802).

In such system, the external terminal accesses the electronic device storing the contents or a server managing the same to acquire the contents.

SUMMARY OF THE INVENTION

In the above-described system, when acquiring the contents, address information on the WAN of the electronic device or the server or the contents is necessary for the external terminal. As the address information, there is an Internet Protocol (IP) address, a domain name, a Uniform Resource Identifier (URI). Not the address information in the LAN but the address information accessible from outside through the WAN (hereinafter, referred to as global address information) is necessary for the external terminal.

However, the global address information is not assigned to the electronic device or the server in the LAN in general, and the global address information is assigned to only a relay device between the LAN and the WAN such as a router and a gateway. By setting to forward to specific electronic device and server according to a port number and the like, communication between the external terminal and the electronic device in the LAN becomes possible.

In a case of the LAN for a home or a small office, dynamic global address information is often assigned to the relay device, so that when the global address of the relay device is changed, it is necessary to notify the external terminal of this or update registration of a Domain Name System (DNS) each time.

In this manner, in order to enable the access from outside to the electronic device in the LAN, various settings and notifications are necessary in addition to setting for accessing the server on the WAN from the electronic device in the LAN through the relay device. Such various settings and notifications have to be performed when a user or a network manager build the LAN or add the electronic device.

In light of the foregoing, it is desirable to acquire the contents providing system capable of accessing the electronic device in the LAN through the WAN and the server device and the contents transmission device, which may be used in the system, substantially without the various settings and notifications.

According to an embodiment of the present invention, the following is provided.

A contents providing system according to the present invention includes: a server device connected to a first network; and a contents transmission device connectable to the first network through a relay device and connected to a second network for reading contents stored in a predetermined recording unit to transmit through the second network; wherein the server device (a) registers a contents transmission request when receiving the contents transmission request to the contents transmission device from a terminal device, which may communicate through the first network, (b) determines whether the contents transmission request to the contents transmission device is registered when there is an inquiry from the contents transmission device, and (c) transmits the contents transmission request to the contents transmission device as a response to the inquiry when the contents transmission request to the contents transmission device is registered, and the contents transmission device makes an inquiry to the server device of whether the contents transmission request to the device itself is registered, and when receiving the contents transmission request as the response to the inquiry, transmits the contents specified by the contents transmission request.

According to this, there is not the access from the server device on a side of the WAN to the device on a side of the LAN, so that it is not necessary to perform setting to enable the access from outside to the electronic device in the LAN. Therefore, the access to the electronic device in the LAN through the WAN becomes possible substantially without the various settings and notifications.

A server device according to the present invention includes: a communicating unit connected to a first network; and a processing unit; wherein the processing unit (a) registers a contents transmission request when receiving the contents transmission request to a contents transmission device connectable to the first network through a relay device and connected to a second network for reading contents stored in a predetermined recording unit to transmit through the second network through the communicating unit, (b) determines whether the contents transmission request to the contents transmission device is registered when there is an inquiry from the contents transmission device, and (c) transmits the contents transmission request to the contents transmission device through the communicating unit as a response to the inquiry when the contents transmission request to the contents transmission device is registered.

According to this, there is not the access from the server device on the side of the WAN to the device on the side of the LAN, so that it is not necessary to perform the setting to enable the access from outside to the electronic device in the LAN. Therefore, the access to the electronic device in the LAN through the WAN becomes possible substantially without the various settings and notifications.

The sever device according to the present invention may be configured as follows. The processing unit receives user identification information from a source of the contents transmission request, and transmits the contents transmission request to the contents transmission device only when the received user identification information is the user identification information of a user allowed to access the recording unit storing the contents.

According to this, access control of the contents may be performed in the server device.

The sever device according to the present invention may be configured as follows. The processing unit receives user identification information from a source of the contents transmission request, and transmits the contents transmission request to the contents transmission device only when the received user identification information is the user identification information of a user allowed to access the contents.

According to this, the access control of the contents may be performed in the server device.

The server device according to the present invention may be configured as follows. The processing unit receives the inquiry by a HTTP command to a predetermined URI in the server device and transmits the contents transmission request as a response to the HTTP command.

A contents transmission device according to the present invention includes: one or a plurality of recording units each storing contents; a communicating unit connectable to a first network through a relay device and connected to a second network; and a communication processing unit for monitoring whether a contents transmission request transmitted by a terminal device, which may communicate through the first network, is registered in a server device connected to the first network, and when the contents transmission request is registered, reading the contents specified by the contents transmission request from any of the one or a plurality of recording units to transmit through the communication unit.

According to this, there is not the access from the server device on the side of the WAN to the device on the side of the LAN, so that it is not necessary to perform the setting to enable the access from outside to the electronic device in the LAN. Therefore, the access to the electronic device in the LAN through the WAN becomes possible substantially without the various settings and notifications.

A contents transmission device according to the present invention includes: an interface capable of reading contents from one or a plurality of recording units each storing the contents; a communicating unit connected to a second network connectable to a first network through a relay device; and a communication processing unit for monitoring whether a contents transmission request transmitted by a terminal device, which may communicate through the first network, is registered in a server device connected to the first network, and when the contents transmission request is registered, reading the contents specified by the contents transmission request from any of the one or a plurality of recording units through the interface to transmit through the communication unit.

According to this, there is not the access from the server device on the side of the WAN to the device on the side of the LAN, so that it is not necessary to perform the setting to enable the access from outside to the electronic device in the LAN. Therefore, the access to the electronic device in the LAN through the WAN becomes possible substantially without the various settings and notifications.

The contents transmission device according to the present invention may be configured as follow. The communication processing unit transmits an inquiry by a HTTP command to a predetermined URI in the server device and receives the contents transmission request as a response to the HTTP command.

According to an embodiment of the present invention, the contents providing system capable of accessing the electronic device in the LAN through the WAN and the server device and the contents transmission device, which may be used in the system, may be acquired substantially without the various settings and notifications.

BRIEF DESCRIPTION OF THE DRAWINGS

FIG. 3 is a view showing an example of a device table and an authentication table in FIG. 2;

FIG. 7 is a view showing an example of the authentication table in a second embodiment.

DETAILED DESCRIPTION OF THE EMBODIMENTS

Figure 1:
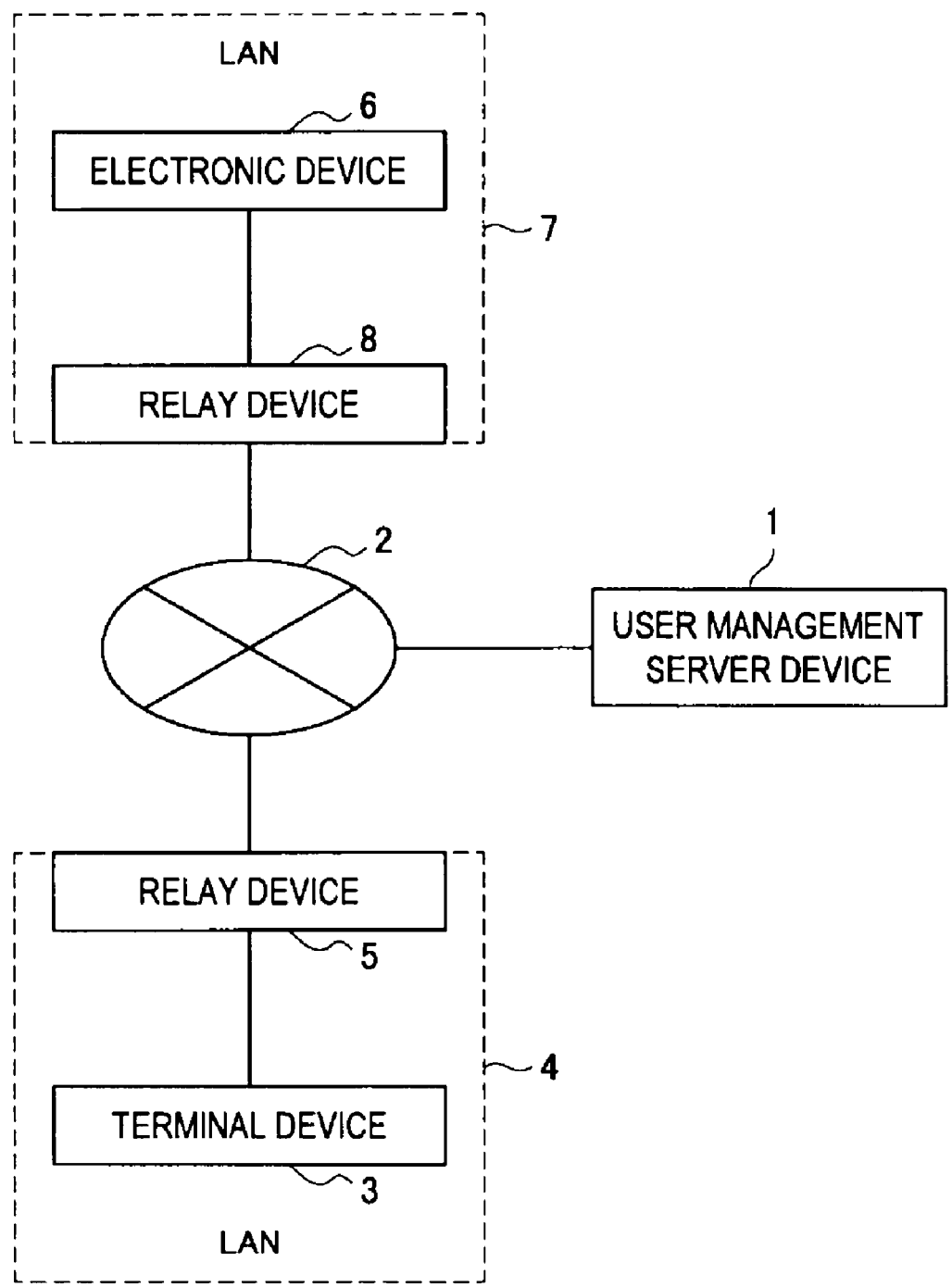
FIG. 1 is a block diagram showing a configuration of a contents providing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

FIG. 1 is a block diagram showing a configuration of a contents providing system according to a first embodiment of the present invention. In this system, contents stored in an electronic device 6 in a LAN 7 are acquired by a terminal device 3 through a WAN 2.

In FIG. 1, a user management server device 1 is a server device connected to the WAN 2. The user management server device 1 is the device to which static global address information on the WAN 2 is assigned. The global information includes an IP address, a URI and the like on the WAN 2. The user management server device 1 is the server device, which accepts a contents transmission request from the terminal device 3 and responds to an inquiry from the electronic device 6 of whether the contents transmission request is present.

Further, the user management server device 1 has a user management function. The user management server device 1 stores registration information (such as a user ID and a password) of one or a plurality of users registered in the user management server device 1, authenticates the user based on the user ID and the password of the user transmitted through the WAN 2 by the terminal device 3 and the like operated by the user and the registration information, and provides various services to a legitimate user.

Figure 2:
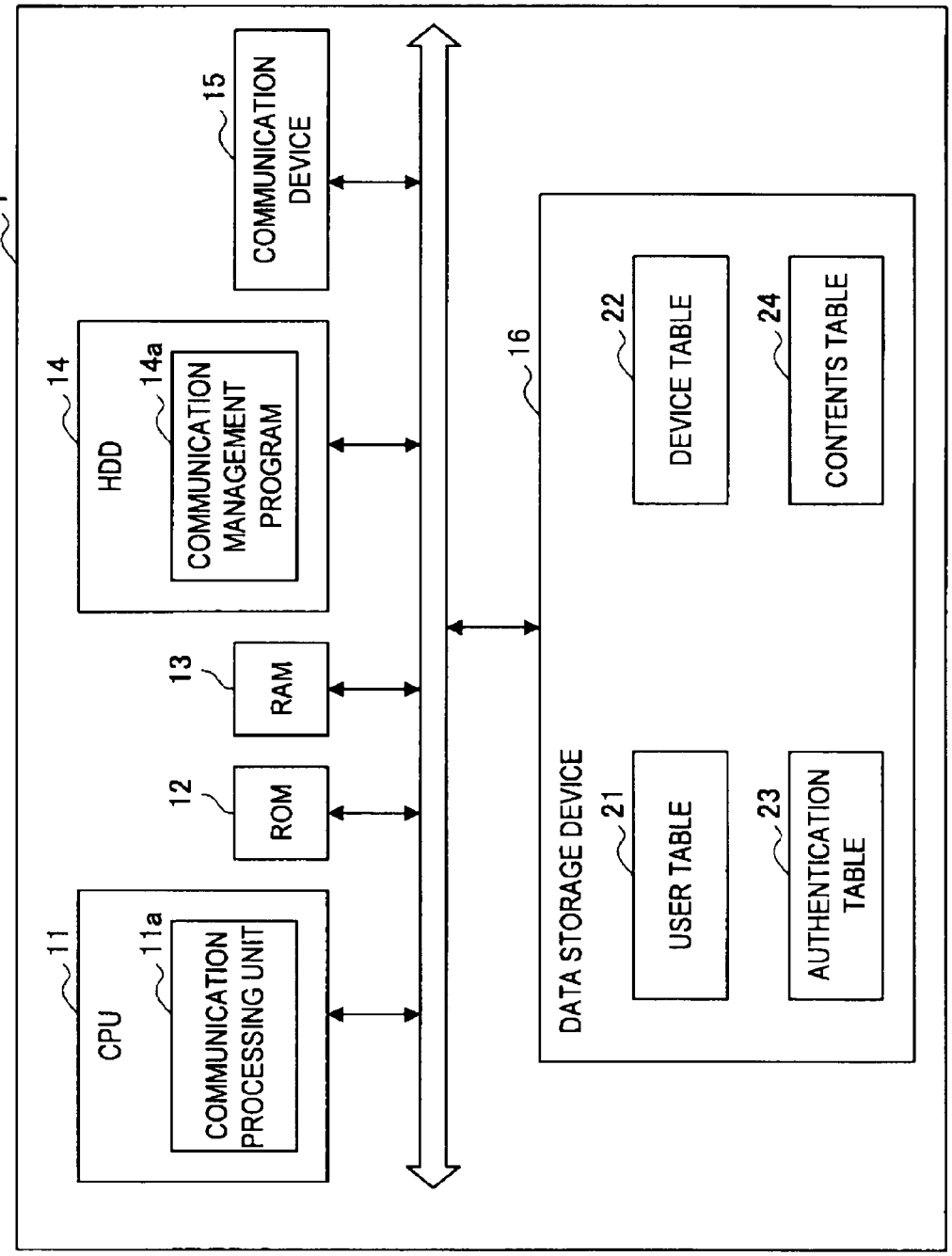
FIG. 2 is a block diagram showing a configuration of a user management server device in FIG. 1.

The user management server device 1 has a computer built-in. FIG. 2 is a block diagram showing a configuration of the user management server device 1 in FIG. 1. In FIG. 2, a CPU 11 is a processing device for executing a program to execute a process described in the program. A ROM 12 is a nonvolatile memory, which stores the program and data in advance. A RAM 13 is a memory, which temporarily stores the program and the data when executing the program. A HDD 14 is a hard disk driving device as a recording medium, which stores an operating system not shown and the program such as a communication management program 14a. A communication device 15 is a device to be connected to the WAN 2 for executing data communication with another device through the WAN 2. As the communication device 15, a network interface card, a modem and the like are appropriately used, for example.

A communication processing unit 11a is realized by execution of the communication management program 14a by the CPU 11. The communication processing unit 11a is a processing unit for controlling the communication device 15 to communicate through the WAN 2. Meanwhile, in the first embodiment, the communication processing unit 11a has a function as a HyperText Transfer Protocol (HTTP) server, and may perform the data communication using a HTTP with another device having a HTTP client function through the WAN 2. Therefore, the IP address on the WAN 2 is assigned to the communication processing unit 11a.

The communication processing unit 11a has (a) a registration function to register the contents transmission request when receiving the contents transmission request to the electronic device 6 through the communication device 15, (b) a search function to search the registration information to determine whether the contents transmission request to the electronic device 6 is registered when there is the inquiry from the electronic device 6, and (c) a response function to transmit the contents transmission request to the electronic device 6 through the communication device 15 as a response to the inquiry when the contents transmission request to the electronic device 6, which makes the inquiry, is registered.

A data storage device 16 is a device capable of storing high-capacity data. The data storage device 16 stores a user table 21, a device table 22, an authentication table 23 and a contents table 24. Each of the tables 21 to 24 may also be realized as a database. As the data storage device 16, the hard disk driving device, a disk array device and the like are used.

The user table 21 is a table including the registration information of the user. The registration information of the user includes the user ID, the password, user attribution information and the like.

In the device table 22, the user ID of the user who manages the electronic device 6 and a device ID inherent to a recording medium of the electronic device 6 are associated with each other and registered. Meanwhile, when the number of the recording medium of the electronic device 6 is one, identification information inherent to the electronic device 6 may be used as the device ID. A combination of the user ID and the device ID registered in the device table 22 is set by the user of the user ID. For example, the user accesses the user management server device 1 using the terminal device 3 to input the device ID of the recording medium of the electronic device 6, which the user himself/herself manages. In the user management server device 1, the input device ID is associated with the user ID and registered in the device table 22.

In the authentication table 23, the device ID of the recording medium in the electronic device 6 and one or a plurality of user IDs of one or a plurality of users allowed to access the contents in the recording medium are associated with each other and registered. A combination of the device ID and the user ID registered in the authentication table 23 is set by the user who is a manager of the recording medium of the device ID. That is to say, the user ID of the user allowed to access is set by the user of the user ID associated with the device ID in the device table 22. For example, the user accesses the user management server device 1 using the terminal device 3 to input the device ID of the recording medium of the electronic device 6 managed by the user himself/herself and the user ID of the user allowed to access the contents in the recording medium. In the user management server device 1, the input device ID and user ID are associated with each other and registered in the authentication table 23. As the device ID, a Media Access Control (MAC) address, a serial number assigned in advance and the like are used, for example.

In the contents table 24, the device ID of the recording medium registered in the device table 22 and a list (hereinafter, referred to as a contents list) of the identification information inherent to the contents in the recording medium (hereinafter, referred to as a contents ID) are associated with each other and registered. As the contents ID, a code, a file name and the like inherent to the contents are used, for example. Meanwhile, an attribution (such as a name and a description of content) of the contents may be added to the contents ID. The contents list registered in the contents table 24 is uploaded by the electronic device 6. The electronic device 6 generates the contents list by referring to its own recording medium and uploads the same.

FIG. 3 is a view showing an example of the device table 22 and the authentication table 23 in FIG. 2. In the authentication table 23 shown in FIG. 3, for example, the access to the contents in the recording medium of a device ID "dev2372" is allowed to the user of a user ID "ax8291" who is the manager of the recording medium (that is to say, the manager of the electronic device 6) and another user of a user ID "bx0618".

Meanwhile, the registration information of the contents transmission request is stored in the data storage device 16 or the RAM 13.

Meanwhile, in the user management server device 1, the CPU 11, the ROM 12, the RAM 13, the HDD 14, the communication device 15 and the data storage device 16 are connected so as to be able to communicate to one another through a bus, a controller and the like.

The WAN 2 in FIG. 1 is a wide area network such as the Internet. In the first embodiment, the WAN 2 is one IP network.

The terminal device 3 is a terminal device connected to a LAN 4 different from the LAN 7 in which the electronic device 6 is present and may perform network communication. The terminal device 3 may access a device (such as a server) connected to the WAN 2 by relay of communication by a relay device 5. The terminal device 3 is operated by the user registered in the user management server device 1. As the terminal device 3, a cell phone, a personal computer and the like are used.

Figure 4:
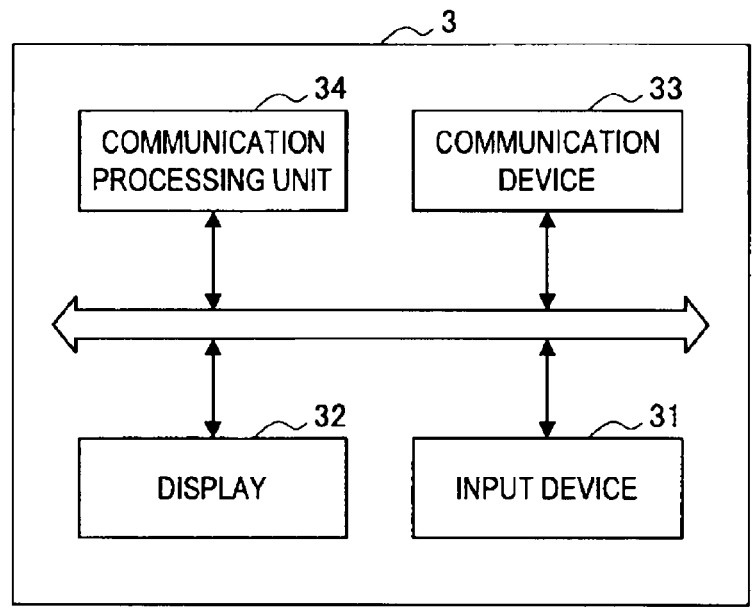
FIG. 4 is a block diagram showing a configuration of a terminal device in FIG. 1.

FIG. 4 is a block diagram showing a configuration of the terminal device 3 in FIG. 1. In FIG. 4, an input device 31 is a device such as a keyboard and a key for converting the user operation to an electric signal. A display 32 is an output device for displaying various pieces of information. A communication device 33 is a device connected to the LAN 4 for executing the data communication with another device through the relay device 5 and the WAN 2. As the communication device 33, the network interface card is used, for example.

A communication processing unit 34 is a processing unit for controlling the communication device 33 based on the user operation to the input device 31 and accessing the user management server device 1 through the WAN 2 to transmit and receive the various pieces of information. Meanwhile, the communication processing unit 34 is realized by a digital signal processor, the computer and the like. The communication processing unit 34 has a function to perform the communication according to a protocol such as a Transmission Control Protocol (TCP) and a User Datagram Protocol (UDP) for performing the communication in the IP network and the HTTP client function operating at a level higher than the same. Therefore, a local IP address in the LAN 4 is assigned to the communication processing unit 34. Meanwhile, the HTTP client function of the communication processing unit 34 is realized by execution of the web browser program by the computer and the like, for example. Such web browser program is stored in the recording medium such as the hard disk drive not shown.

Further, the communication processing unit 34 has (a) a login function to store the URI of the user management server device 1 in advance, access the URI of the user management server device 1 and transmit the user identification information input by the user operation to the input device 31 to log in, (b) a list acquisition function to acquire the list of the contents to which the access by the user logging in is allowed from the user management server device 1, and (c) a contents transmission request function to transmit the contents transmission request about the contents selected by the user operation to the input device 31 to the user management server device 1.

The LAN 4 in FIG. 1 is a narrow area network such as a local area network. In the first embodiment, the LAN 4 is one IP network other than the WAN 2.

The relay device 5 is a device to relay the communication between the LAN 4 and the WAN 2. As the relay device 5, a gateway or a router is appropriately used. The relay device 5 has two network interfaces in which one network interface is connected to the LAN 4 and the other network interface is connected to the WAN 2.

The electronic device 6 is a contents transmission device connected to the LAN 7 for reading the contents stored in a predetermined recording medium to transmit through the LAN 7. The recording medium may be built into the electronic device 6 or accommodated in an external device connected to the electronic device 6 through a communication interface. The contents are composed of one or a plurality of various data files. The electronic device 6 may access the device (such as the server) connected to the WAN 2 by the relay of the communication by a relay device 8.

Figure 5:
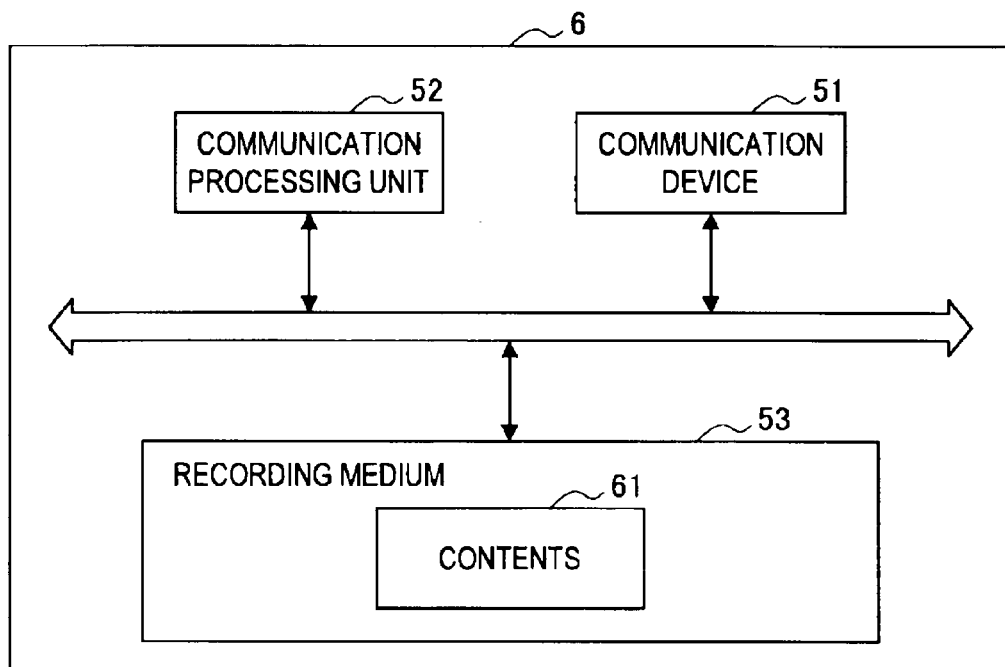
FIG. 5 is a block diagram showing a configuration of an electronic device in FIG. 1.

FIG. 5 is a block diagram showing a configuration of the electronic device 6 in FIG. 1. In FIG. 5, a communication device 51 is a device connected to the LAN 7 for executing the data communication with another device through the relay device 8 and the WAN 2. As the communication device 51, the network interface card is used, for example.

A communication processing unit 52 is a processing unit for controlling the communication device 51 and accessing the user management server device 1 through the WAN 2 to transmit and receive the various pieces of information. Meanwhile, the communication processing unit 52 is realized by the digital signal processor, the computer and the like. The communication processing unit 52 has the function to perform the communication according to the protocol such as the TCP and the UDP for performing the communication in the IP network and the HTTP client function operating at the level higher than the same. Therefore, the local IP address in the LAN 7 is assigned to the communication processing unit 52.

The communication processing unit 52 has (a) a monitoring function to monitor whether the contents transmission request transmitted by the terminal device 3 and the like is registered in the user management server device 1 by repeatedly making inquiries to the server device 1 through the communication device 51 and (b) a contents transmission function to read the contents specified by the contents transmission request from the recording medium 53 to transmit through the communication device 6 when the contents transmission request is registered. The communication processing unit 52 acts as a communication processing unit.

The recording medium 53 is a device capable of storing the contents 61. As the recording medium 53, the hard disk drive of which media are fixed and a drive or a reader to which detachable media such as a recording disk and a semiconductor memory are mounted are used.

The LAN 7 in FIG. 1 is the narrow area network such as the local area network. In the first embodiment, the LAN 7 is one IP network other than the WAN 2 and the LAN 4.

The relay device 8 is a device for relaying the communication between the LAN 7 and the WAN 2. As the relay device 8, the gateway or the router is appropriately used. The relay device 8 has two network interfaces in which one network interface is connected to the LAN 7 and the other network interface is connected to the WAN 2.

Figure 6:
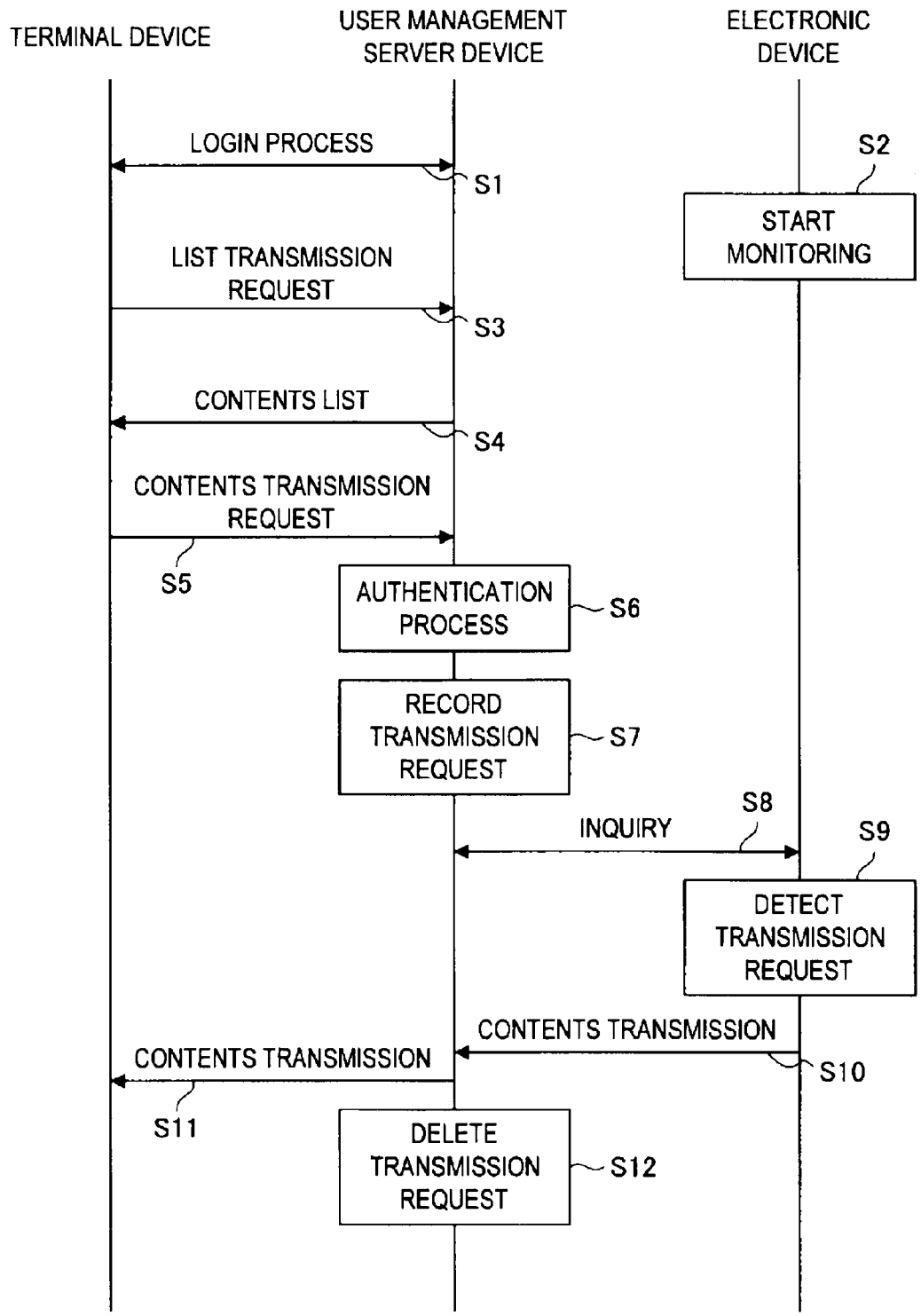
FIG. 6 is a view for illustrating operation of each device when contents are provided from the electronic device to the terminal device in the first embodiment.

Next, the operation of each device in the above-described system is described. FIG. 6 is a view for illustrating operation of each device when the contents 61 are provided from the electronic device 6 to the terminal device 3 in the first embodiment.

First, the user operates the terminal device 3 to log in the user management server device 1 in which the user himself/herself is registered (step S1). At that time, the communication processing unit 34 of the terminal device 3 executes the web browser program based on the user operation to the input device 31, and when the URL of a login page is input to the web browser displayed on the display 32 by the user operation, this controls the communication device 33 to acquire a web page of the URL through the network 3 according to the HTTP. On the other hand, when the communication processing unit 11a of the user management server device 1 receives a command of the HTTP, which specifies the URL, through the communication device 15, this transmits a login page file. When the communication processing unit 34 of the terminal device 3 acquires the login page file, this allows the display 32 to display the login page based on the file. In the login page, when the user ID and the password (that is to say, the user identification information) are input by the user operation to the input device 31, the communication processing unit 34 transmits the user ID and the password to the user management server device 1. When the communication processing unit 11a of the user management server device 1 receives the user ID and the password, this refers to the user table 21 to determine whether to allow the user to log in and specifies the user. When the user who operates the terminal device 3 is the legitimate user, the user is allowed to log in by the user management server device 1.

Such communication between the terminal device 3 and the user management server device 1 is started by the request such as a web page transmission request from the terminal device 3. Such request is first transmitted from the terminal device 3 to the relay device 5 in the LAN 4, and next transmitted from the relay device 5 to the user management server device 1 on the WAN 2. The response to such request is transmitted from the user management server device 1 to the terminal device 3 through the above-described path in an opposite direction. At that time, the terminal device 3 acquires the IP address on the WAN 2 of the user management server device 1, which is a destination, from a domain name of the URI thereof, using the DNS, and transmits the request to the IP address. On the other hand, the user management server device 1 transmits the response to the request to the IP address of the relay device 5 on the WAN 2. When the relay device 5 receives the response, this transmits the same to the IP address in the LAN 4 of the terminal device 3, which transmits the request.

On the other hand, when the electronic device 6 is activated, the communication processing unit 52 of the electronic device 6 starts monitoring whether the contents transmission request to the unit itself is registered in the user management server device 1 (step S2). At that time, the communication processing unit 52 makes an inquiry to the URI of a predetermined Common Gate Interface (CGI) of the user management server device 1 by transmitting the HTTP command, and determines whether the contents transmission request to the unit itself is registered in the user management server device 1 from the response. The inquiry is repeatedly executed at regular intervals.

Such communication between the electronic device 6 and the user management server device 1 is started by the request such as the inquiry from the electronic device 6. Such request is first transmitted from the electronic device 6 to the relay device 8 in the LAN 7, and next transmitted from the relay device 8 to the user management server device 1 on the WAN 2. The response to such request is transmitted from the user management server device 1 to the electronic device 6 through the above-described path in the opposite direction. At that time, the electronic device 6 acquires the IP address on the WAN 2 from the domain name of the URI of the user management server device 1, which is the destination, using the DNS, and transmits the request to the IP address. On the other hand, the user management server device 1 transmits the response to the request to the IP address of the relay device 8 on the WAN 2. When the relay device 8 receives the response, this transmits the same to the IP address in the LAN 7 of the electronic device 6, which transmits the request.

In the terminal device 3, when predetermined operation by the user is detected after the login of the user, the communication device 33 transmits the transmission request of the list of the contents 61 to which the user is allowed to access to the user management server device 1 (step S3). At that time, the user ID of the user logging in is transmitted together with the list transmission request.

When the communication processing unit 11a of the user management server device 1 receives the user ID of the user logging in together with the list transmission request, this searches the received user ID in the authentication table 23, and when this finds the user ID, this specifies the device ID associated with the user ID. Then, the communication processing unit 11a refers to the contents table 24 to read the contents list associated with the specified device ID. The communication processing unit 11a transmits read one or a plurality of contents lists to the terminal device 3 as the response to the list transmission request (step S4).

In the terminal device 3, when the communication processing unit 34 receives the contents list as the response to the list transmission request, this allows the display 32 to display the same. After that, when any contents 61 are selected by the user operation to the input device 31, the communication processing unit 34 specifies the selected contents ID. After that, the communication processing unit 34 transmits the contents transmission request to the user management server device 1 together with the specified contents ID and the user ID of the user logging in (step S5). The contents transmission request is made a GET command of the HTTP.

When the communication processing unit 11a of the user management server device 1 receives the contents transmission request, the contents ID and the user ID, this refers to the authentication table 23 and the contents table 24 and determines whether the access to the electronic device 6 storing the contents 61 of the contents ID is allowed to the user of the user ID (step S6). When the access is allowed to the user, the device ID and the contents ID are associated with each other and stored in the RAM 13 or the data storage device 16 as the registration information (step S7). When the access is not allowed to the user, the registration information is not stored and the contents transmission request is not transmitted to the electronic device 6.

On the other hand, as described above, the electronic device 6 monitors whether the contents transmission request to the device itself is registered in the user management server device 1, so that, when the registration information is stored, by the response to the inquiry thereafter (step S8), this detects that the contents transmission request to the device itself is registered in the user management server device 1 (step S9).

At that time, the device ID is included in the inquiry from the electronic device 6 to the user management server device 1, and in the user management server device 1, when the registration information including the device ID is present, the device ID and the contents ID of the registration information are included in the response as the contents transmission request. Therefore, in the electronic device 6, it is detected that the contents transmission request to the device itself is registered in the user management server device 1.

In the electronic device 6, the communication processing unit 52 specifies the recording medium 53 and the contents 61, which are targets of the contents transmission request to the device itself, from the device ID and the contents ID included in the response. The communication processing unit 52 reads the specified contents 61 from the recording medium 53 and uploads the same to a predetermined URI of the user management server device 1 (step S10). At that time, the contents 61 are uploaded by a POST command of the HTTP. In the user management server device 1, the contents 61 are received by the CGI of the communication processing unit 11a and temporarily stored in the RAM 13 or the data storage device 16.

The communication processing unit 11a of the user management server device 1 transmits the contents 61 to the terminal device 3 as the response to the contents transmission request received at the step S5 (step S11). In the terminal device 3, the contents 61 are received by the communication processing unit 34. Thereafter, when the transmission of the contents 16 is completed, the communication processing unit 11a of the user management server device 1 deletes the registration information corresponding to the contents transmission request from the RAM 13 or the data storage device 16 (step S12).

As described above, according to the above-described first embodiment, there is not the access from the user management server device 1 on a side of the WAN 2 to the device on a side of the LANs 4 and 7, so that it is not necessary to make setting and the like to enable the access from outside to the electronic device 6 in the LANs 4 and 7. Therefore, the access to the electronic device 6 in the LAN 7 becomes possible through the WAN 2 substantially without various settings and notifications.

According to the above-described first embodiment, in the user management server device 1, access control of the contents 61 may be performed in device ID unit.

Second Embodiment

In the contents providing system according to a second embodiment of the present invention, access permission is set not for each recording medium 53 but for each contents 61. Meanwhile, although the configuration of the contents providing system according to the second embodiment is similar to that of the first embodiment, the user management server device 1 operates as follows.

FIG. 7 is a view showing an example of the authentication table 23 in the second embodiment. As shown in FIG. 7, the user ID of the user allowed to access the contents 61 and the contents ID of the contents 61 are associated with each other and registered. The device ID of the recording medium 53 in which the contents 61 are stored also is associated with the contents ID of the contents 61 and registered. Meanwhile, in the authentication table 23, all the contents and all the users may be indicated using a special symbol such as a wild card as the contents ID and the user ID.

In the authentication table 23 shown in FIG. 7, the access to the contents 61 of a contents ID "con28190" in the recording medium 53 of the device ID "dev2372" is allowed to the user of the user ID "bx0618". In the authentication table 23 shown in FIG. 7, the access to all the contents 61 in the recording medium 53 of the device ID "dev2372" is allowed to the user of the user ID "ax8291". In the authentication table 23 shown in FIG. 7, the access to the contents 61 of the contents ID "con28191" in the recording medium 53 of the device ID "dev2372" is allowed to all the users.

In the second embodiment, at the above-described step S4, the communication processing unit 11a of the user management server device 1 refers to the authentication table 23 and deletes the contents ID of the contents to which the access is not allowed from the contents list to generate a contents list for transmission, and transmits the generated list to the terminal device 3. At the above-described step S6, when the communication processing unit 11a of the user management server device 1 receives the contents transmission request, the contents ID and the user ID, this refers to the authentication table 23 and the contents table 24 and determines whether the access to the contents 61 of the contents ID is allowed to the user of the user ID. Then, at the above-described step S7, when the access to the contents 61 is allowed to the user, the device ID and the contents ID are associated with each other and stored in the RAM 13 or the data storage device 16 as the registration information.

According to this, the setting of the access permission for each contents 61 becomes possible. Meanwhile, other operation of the user management server device 1 is similar to that of the first embodiment, so that the description thereof is omitted.

As described above, according to the above-described second embodiment, the access control of the contents 61 may be performed in contents ID unit in the user management server device 1.

Third Embodiment

In the contents providing system according to a third embodiment of the present invention, a plurality of electronic devices each having the recording medium are connected to a hub device, and the hub device accepts the contents transmission request.

Figure 8:
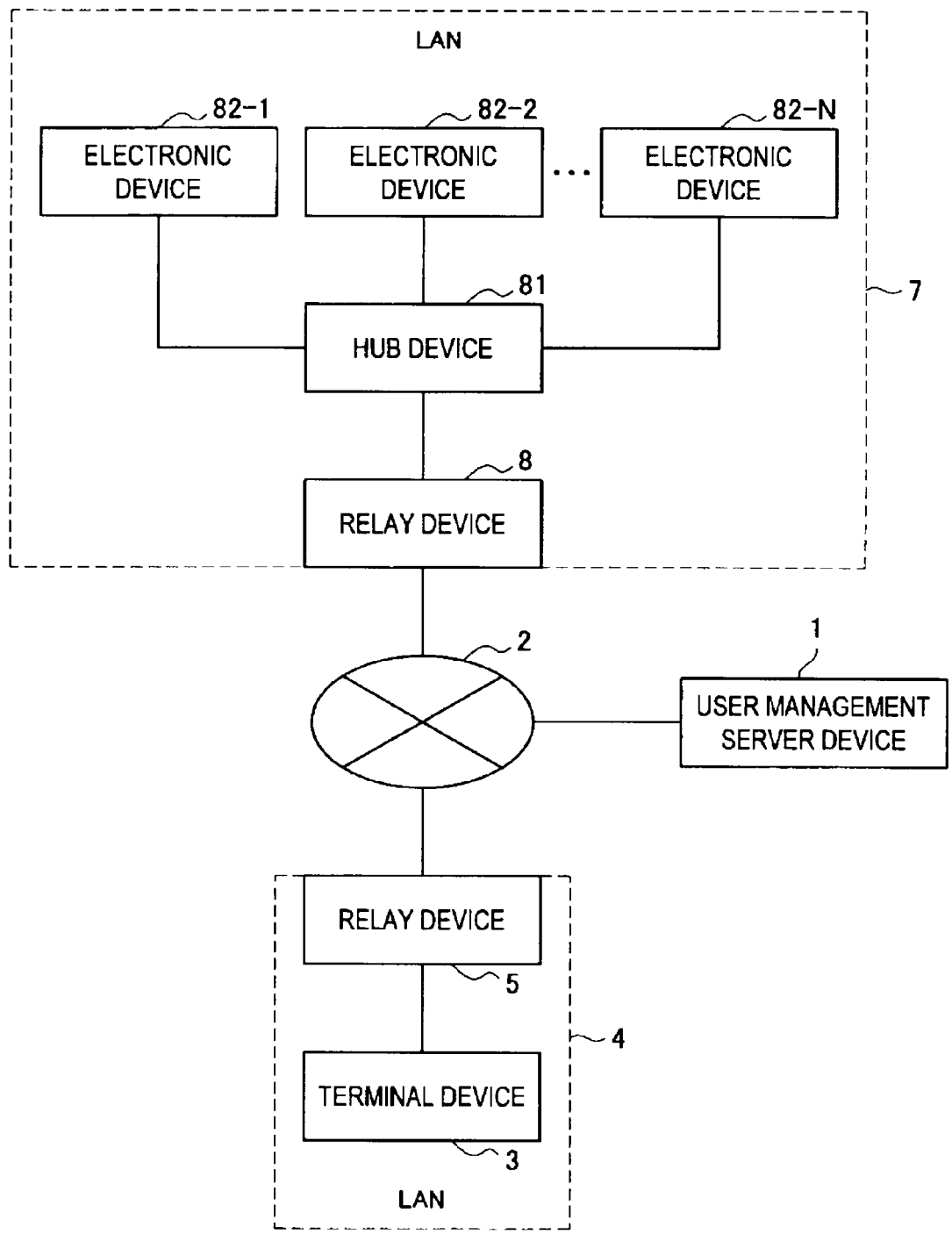
FIG. 8 is a block diagram showing a configuration of a contents providing system according to a third embodiment of the present invention.

FIG. 8 is a block diagram showing a configuration of the contents providing system according to the third embodiment of the present invention. In this system, one or a plurality of electronic devices 82-1 to N are connected to a hub device 81 connected to the LAN 7.

The hub device 81 is the contents transmission device similar to the above-described electronic device 6. However, the hub device 81 has an interface and uses the recording medium in the electronic device 82-i connected by the interface in place of the recording medium 53 shown in FIG. 5. Therefore, in the third embodiment, the hub device 81 makes an inquiry to the user management server device 1 of whether the contents transmission request about the recording medium of each of the electronic devices 82-1 to 82-N is present. Meanwhile, a wired or wireless interface such as a Universal Serial Bus (USB), Bluetooth (registered trademark) may be used in the connection between the hub device 81 and the electronic device 82-i. The hub device 81 generates the contents list for the recording medium of each of the electronic devices 82-1 to 82-N and uploads the same to the user management server device 1.

The electronic device 82-i (i=1, N) is a device having the recording medium capable of storing the contents. The electronic device 82-i has the interface, receives the command from the external device through the interface, and reads and/or writes the contents according to the command. As such electronic device 82-i, the hard disk drive of which media are fixed and the drive or the reader to which the detachable media such as the recording disk and the semiconductor memory are mounted, each having the interface such as the USB are used.

Meanwhile, another configuration and operation of the contents providing system according to the third embodiment are similar to those of the first or second embodiment, the descriptions thereof are omitted.

As described above, according to the above-described third embodiment, the contents may be provided as in the first and second embodiments also in the embodiment in which the electronic device 82-i is connected to the hub device 81.

It should be understood by those skilled in the art that various modifications, combinations, sub-combinations and alterations may occur depending on design requirements and other factors insofar as they are within the scope of the appended claims or the equivalents thereof.

For example, in the first embodiment, it is possible to provide a plurality of recording media 53 and different contents 61 may be stored in each of the recording media 53. In this case, the device ID is assigned to each of the recording media 53 and managed. As a plurality of recording media 53, there are a plurality of hard disk drives, and the hard disk drive and a DVD drive to which a Digital Versatile Disc (DVD) is mounted.

Although the contents 61 are transmitted collectively in the first to third embodiments, it is possible to sequentially transmit the data of the contents 61 from the electronic device 6 to the terminal device 3 through the user management server device 1 as streaming.

Although the contents 61 are transmitted from the electronic device 6 (or the hub device 81) to the terminal device 3 through the user management server device 1 in the first to third embodiments, in a case in which the terminal device 3 has the address on the WAN 2 and the like, the electronic device 6 (or the hub device 81) may directly transmit the contents 61 to the terminal device 3. In this case, address information of the terminal device 3 also is transmitted when the device ID and the contents ID are transmitted to the electronic device 6 (or the hub device 81) as the contents transmission request.

Although the access control is performed for each recording medium 53 of the electronic device 6 or for each contents 61 in the first to third embodiments, it is possible to perform the access control for each directory including the contents 61.

It should be understood by those skilled in the art that various modifications, combinations, sub-combinations and alterations may occur depending on design requirements and other factors insofar as they are within the scope of the appended claims or the equivalents thereof.

[Industrial Applicability]

The present invention is applicable to provision of the contents between the users, for example.

The present application contains subject matter related to that disclosed in Japanese Priority Patent Application JP 2009-007058 filed in the Japan Patent Office on Jan. 15, 2009, the entire content of which is hereby incorporated by reference.

What is claimed is:

1. A contents providing system comprising:
a server device connected to a first network; and
a contents transmission device connectable to the first network through a relay device and connected to a second network for reading contents stored in a predetermined recording unit to transmit through the second network, wherein the server device
registers a contents transmission request to the contents transmission device, the contents transmission request received from a terminal device that communicates through the first network, and transmits the contents transmission request to the contents transmission device as a response to an inquiry by the contents transmission device upon determination that the contents transmission request is registered at the server device, and the contents transmission device makes the inquiry to the server device of whether the contents transmission request to the contents transmission device is registered, and upon receiving the contents transmission request as the response to the inquiry, transmits the contents specified by the contents transmission request to the terminal device.

2. A server device comprising:

a communicating unit connected to a first network; and a processing unit connected to the communication unit;

wherein the processing unit registers a contents transmission request to a contents transmission device, the contents transmission request received from a terminal device that communicates through the first network, and transmits the contents transmission request to the contents transmission device through the communicating unit as a response to an inquiry by the contents transmission device upon determination that the contents transmission request registered to the contents transmission device is at the server device, the contents transmission device connectable to the first network through a relay device and connected to a second network for reading contents stored in a predetermined recording unit to transmit through the second network through the communicating unit.

3. The sever device according to claim 2, wherein the processing unit receives user identification information from the terminal device, and transmits the contents transmission request to the contents transmission device only upon determination that the received user identification information is associated with the terminal device and all contents stored on the contents transmission device.

4. The sever device according to claim 2, wherein the processing unit receives user identification information from the terminal device, and transmits the contents transmission request to the contents transmission device only upon determination that the received user identification information is associated with the terminal device and at least a portion of contents stored on the contents transmission device.

5. The server device according to claim 2, wherein the processing unit receives the inquiry by a HTTP command to a predetermined URI in the server device and transmits the contents transmission request as a response to the HTTP command.

6. A contents transmission device comprising:

a recording unit storing contents;

a communicating unit connectable to a first network through a relay device and connected to a second network; and a communication processing unit connected to the communicating unit and recording unit, the communication unit monitors whether a contents transmission request transmitted by a terminal device that communicates through the first network is registered in a server device connected to the first network, and upon determination that the contents transmission request is registered in the server device, reads the contents specified by the contents transmission request from the recording unit and transmits the contents through the communication unit to the terminal device.

7. The contents transmission device according to claim 6, wherein the communication processing unit transmits an inquiry by a HTTP command to a predetermined URI in the server device and receives the contents transmission request as a response to the HTTP command.

8. A contents transmission device comprising:

an interface that reads contents from one or more content transmission devices each storing the contents;

a communicating unit connected to a second network and connectable to a first network through a relay device; and a communication processing unit connected to the one or more content transmission devices via the interface and connected to the communicating unit, the communication processing unit monitors whether a contents transmission request transmitted by a terminal device that communicates through the first network is registered in a server device connected to the first network, and upon determination that the contents transmission request is registered in the server device, reads the contents specified by the contents transmission request from any one of the one or more content transmission devices through the interface, and transmits the contents to the terminal device through the communication unit.

* * * * *